(12) United States Patent
Li et al.

(10) Patent No.: US 8,767,712 B2
(45) Date of Patent: Jul. 1, 2014

(54) MESSAGE FORWARDING USING GRE TUNNELING PROTOCOL

(75) Inventors: Jie Li, Beijing (CN); Peilong Wang, Beijing (CN); Yaping Yuan, Beijing (CN); Jie Zeng, Beijing (CN); Qingwei Xu, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 96 days.

(21) Appl. No.: 13/470,020

(22) Filed: May 11, 2012

(65) Prior Publication Data

US 2012/0287933 A1   Nov. 15, 2012

(30) Foreign Application Priority Data

May 13, 2011 (CN) .......................... 2011 1 0124497

(51) Int. Cl.
*H04L 12/28* (2006.01)
*H04L 12/46* (2006.01)

(52) U.S. Cl.
CPC ................................... *H04L 12/462* (2013.01)
USPC ....................................................... 370/351

(58) Field of Classification Search
CPC .............. H04L 12/462; H04L 12/4625; H04L 12/4633
USPC ......... 370/351, 389, 390, 400, 401, 464, 465; 709/238, 244, 249
See application file for complete search history.

(56) References Cited

U.S. PATENT DOCUMENTS

| 6,115,385 | A  | * | 9/2000  | Vig ................................. 370/401 |
| 6,778,541 | B2 | * | 8/2004  | Houston et al. ................ 370/401 |
| 7,586,878 | B2 | * | 9/2009  | Hsu et al. ....................... 370/331 |
| 7,701,963 | B2 | * | 4/2010  | Rezaiifar et al. ............... 370/446 |
| 7,873,038 | B2 | * | 1/2011  | LaVigne et al. ................ 370/389 |
| 8,018,900 | B2 | * | 9/2011  | Blanchette et al. ............ 370/331 |
| 8,085,727 | B2 | * | 12/2011 | He et al. ......................... 370/331 |
| 8,149,836 | B2 | * | 4/2012  | Porat .............................. 370/392 |
| 2008/0080508 | A1 | | 4/2008 | Das et al. |
| 2011/0075673 | A1 | * | 3/2011 | Hardie et al. .................. 370/401 |

FOREIGN PATENT DOCUMENTS

| CN | 101163088 | 4/2008 |
| CN | 101499972 | 8/2009 |
| CN | 101510889 | 8/2009 |

OTHER PUBLICATIONS

Hanks, General Routing Encapsulation, Network Working Group, RFC 1701, Oct. 1994, pp. 1-8.*
Farinacci, General Routing Encapsulation, Network Working Group, RFC 2784, Mar. 2000, pp. 1-8.*
Dommety, Key and Sequence Number Extentions to GRE, Network Working Group, RFC 2890, Sep. 2000, pp. 1-7.*
CN First Office Action dated Mar. 29, 2013 issued on CN Patent Application No. 201110124497.4 dated May 13, 2011, The State Intellectual Property Office, P.R. China.

* cited by examiner

*Primary Examiner* — Dmitry H Levitan

(57) ABSTRACT

A method of forwarding GRE encapsulated messages by a forwarding device. The method comprises the forwarding device setting up a tunnel table entry upon receipt of a GRE encapsulated message, the GRE encapsulated message comprising subnet mask information of a subnet; and sending a response message to the subnet after setting up the tunnel table entry, the response message comprising information informing the subnet of the setting up of said tunnel table entry.

12 Claims, 5 Drawing Sheets

| 0 | 1 | 2 | 3 | 4 | 5 | 8 | 9 | 13 | 16 | 31 |
|---|---|---|---|---|---|---|---|---|---|---|
| C | R | K | S | s | Recur | A | Flags | Ver | Protocol Type ||
| checksum(optional) |||||||| Offset(optional) |||
| Key(optional) |||||||||||
| Sequence Number(optional) |||||||||||
| Routing(optional) |||||||||||
| Network Mask |||||||||||
| Payload |||||||||||

| 0 | 1 | 2 | 3 | 4 | 5 | | 8 | 9 | | 13 | 16 | | 31 |
|---|---|---|---|---|---|---|---|---|---|---|---|---|---|
| C | R | K | S | s | Recur | | A | Flags | | Ver | Protocol Type | | |
| checksum(optional) | | | | | | | | | | | Offset(optional) | | |
| Key(optional) | | | | | | | | | | | | | |
| Sequence Number(optional) | | | | | | | | | | | | | |
| Routing(optional) | | | | | | | | | | | | | |
| Network Mask | | | | | | | | | | | | | |
| Payload | | | | | | | | | | | | | |

| | Interface name | Tunnel destination address | Branch network address/mask |
|---|---|---|---|
| 1 | Tunnel0 | 20.0.0.1 | 192.168.1.0/255.255.255.0 |
| 2 | Tunnel0 | 20.0.0.1 | 192.168.2.0/255.255.255.0 |
| 3 | Tunnel0 | 20.0.0.1 | 10.0.0.0/255.255.0.0 |
| 4 | Tunnel0 | 30.0.0.1 | 192.168.3.0/255.255.255.0 |

| | Interface name | Tunnel destination address | Branch network address/mask |
|---|---|---|---|
| 1 | Tunnel0 | 20.0.0.1 | 192.168.1.0/255.255.255.0 |
| 2 | Tunnel0 | 20.0.0.1 | 192.168.2.0/255.255.255.0 |
| 3 | Tunnel0 | 20.0.0.1 | 10.0.0.0/255.255.0.0 |
| 4 | Tunnel0 | 30.0.0.1 | 192.168.3.0/255.255.255.128 |
| 5 | Tunnel0 | 30.0.0.1 | 192.168.3.128/255.255.255.128 |

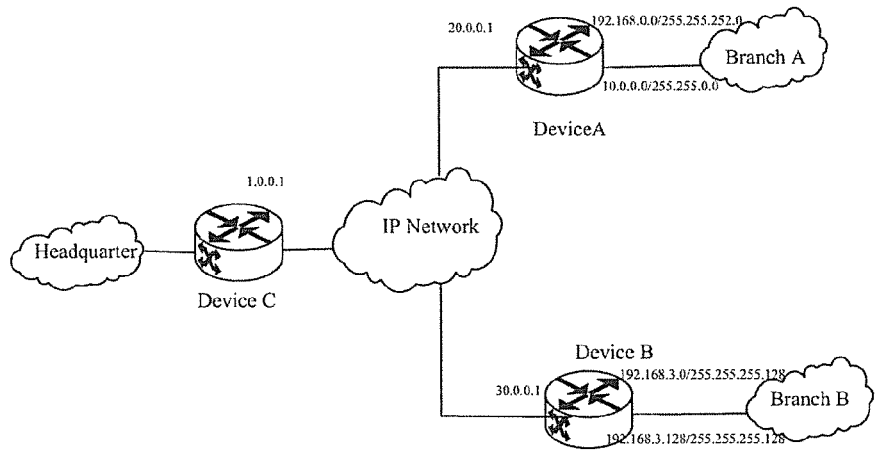
Figure 7
| | Interface name | Tunnel destination address | Branch network address/mask |
|---|---|---|---|
| 1 | Tunnel0 | 20.0.0.1 | 192.168.0.0/255.255.252.0 |
| 2 | Tunnel0 | 20.0.0.1 | 10.0.0.0/255.255.0.0 |
| 3 | Tunnel0 | 30.0.0.1 | 192.168.3.0/255.255.255.128 |
| 4 | Tunnel0 | 30.0.0.1 | 192.168.3.128/255.255.255.128 |
Figure 7A
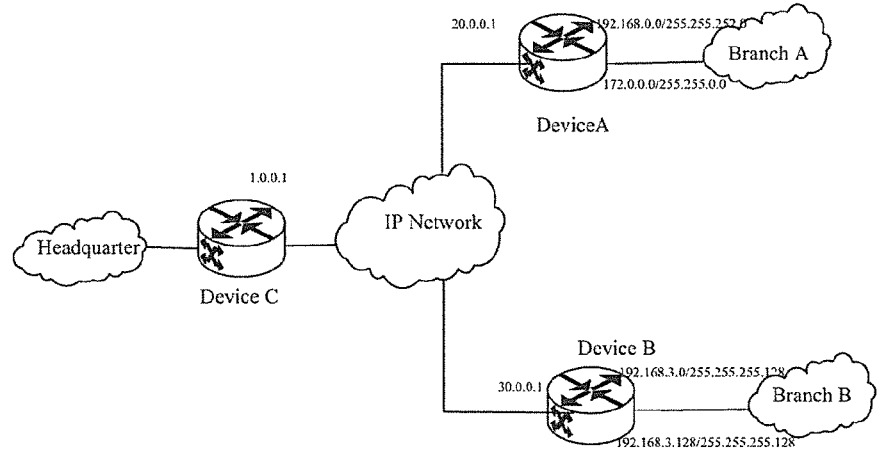
Figure 8

|   | Interface name | Tunnel destination address | Branch network address/mask |
|---|---|---|---|
| 1 | Tunnel0 | 20.0.0.1 | 192.168.0.0/255.255.252.0 |
| 2 | Tunnel0 | 20.0.0.1 | 172.0.0.0/255.255.0.0 |
| 3 | Tunnel0 | 30.0.0.1 | 192.168.3.0/255.255.255.128 |
| 4 | Tunnel0 | 30.0.0.1 | 192.168.3.128/255.255.255.128 |

Figure 8A

MESSAGE FORWARDING USING GRE TUNNELING PROTOCOL

The present application claims priority under 35 U.S. 119 (a)-(d) to Chinese Patent application number 201110124497.4, filed on May 13, 2011, which is incorporated by reference in its entirety.

BACKGROUND

Generic Routing Encapsulation (GRE) is a protocol for performing encapsulation of an arbitrary network layer protocol over another arbitrary network layer protocol. GRE is better known as a tunneling protocol since it allows a tunnel to be created using a certain protocol, which then hides the contents of another protocol carried within the tunnel.

In the most general application, a system has a packet that needs to be encapsulated and delivered to some destination. The packet, which is called 'payload', is first encapsulated in a GRE packet. The resulting GRE packet can then be encapsulated in some other protocol and then forwarded. This outer protocol is called the delivery protocol.

GRE is used, for example, when IP (internet protocol) packets need to be sent from one network to another, without being parsed or treated like IP packets by any intervening routers.

DESCRIPTION OF FIGURES

Example application of the present disclosure will be described by way of example with reference to the accompany Figures, in which, FIG. 7 depicts the example IP network of FIG. 5 with two subnets merged, FIG. 7A is an example table entry corresponding to the updated IP network of FIG. 7, FIG. 8 depicts the example IP network of FIG. 5 with a subnet replaced by another subnet, and FIG. 8A is an example table entry corresponding to the updated IP network of FIG. 8.

DESCRIPTION OF EXAMPLES

Figure 1:
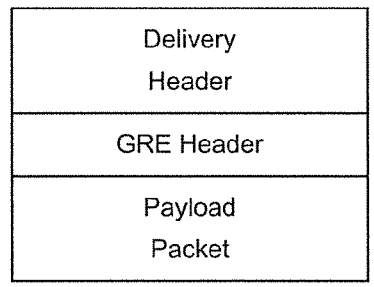
FIG. 1 shows the format of a GRE encapsulated packet.

FIG. 1 shows the general format of encapsulated packets using GRE. The delivery header can be an IPv4 header. The payload packet can be an IPv4 header or a header of another protocol. GRE allows non-IP protocols to be carried in the payload. GRE packets using IPv4 headers are classified as IP protocol type 47. If the packet encapsulated within GRE is also IPv4, the GRE header's protocol type is set to 0x800.

Figure 2:
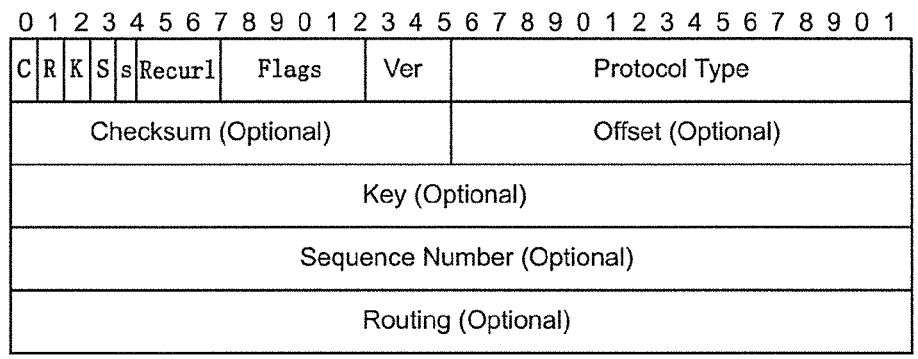
FIG. 2 shows the format of a GRE packet header.

FIG. 2 shows the format of the GRE header based on RFC 1701 and the relevant fields are described in the RFC (Request for Comments).

Conventional GRE tunnels are for point-to-point connections. When GRE is applied in an enterprise network comprising a central node connected to a branch network which comprises a number of branch nodes connected to the central node, the enterprise central node is required to establish a number of tunnels such that an individual tunnel serves a corresponding branch node connected to the central node. Such a network enterprise is an example of point-to-multipoint application of GRE tunnels. When the enterprise network comprises many branch nodes, the processing demand on the central node to configure the individual tunnels will be heavy. This demand is aggravated when there are frequent changes in the configuration of the branch nodes which imposes a high maintenance overhead due to the high configuration processing demand on the central node.

Figure 3:
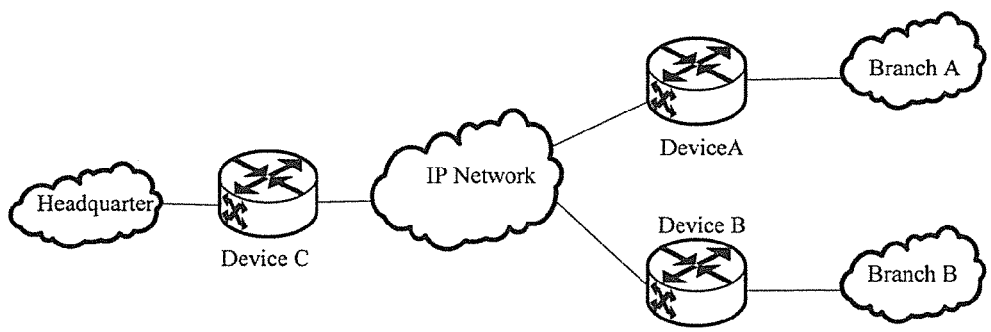
FIG. 3 is a schematic diagram showing an internet network comprising a number of sub-networks.

In the point-to-multipoint applications such as an example network of FIG. 3, the central node C is configured to operate in a point-to-multipoint GRE tunnel mode, and each of the branch nodes A, B is configured to operate in a point-to-point GRE tunnel mode. A GRE tunnel is activated by traffic flowing from a branch node to the central node, and the central node will dynamically establish a tunnel table to linking with the branch network.

When the central node C needs to deliver traffic to a branch network, such as branch B or branch C, the central node C will look up in a local routing table and choose a suitable tunnel exit. After a suitable tunnel exit has been determined, the central node will look up for a tunnel exit in a tunnel table. The traffic will be discarded if there is no suitable or matching tunnel exit in the tunnel table. If there is a matching tunnel exit, the traffic will be encapsulated and forwarded to the destination according to the table.

Modern day computer networks such as IP networks may comprise a number of sub-networks for example, branch A and branch B, which is connected to a common node C. A sub-network, or 'subnet', is a logically visible subdivision of an IP network. The practice of dividing a single network into two or more networks is called 'subnetting' and the networks created are called sub-networks or subnets. The number of branch networks in a modern day internet network may be much larger than 2. All data devices that belong to a subnet are addressed with a common, identical, most-significant bit-group in their IP address. This results in the logical division of an IP address into two fields, a network or routing prefix and the rest field or host identifier. The rest field is an identifier for a specific "host"—either a computer, or a device, or specific network interface on a computer or device. To determine what subnet an IP address belongs to, a mask which is known as a 'subnet mask' is used.

The subnet mask is the network address plus the bits reserved for identifying the sub-network. By convention, the bits for the network address are all set to 1, though it would also work if the bits were set exactly as in the network address.) It is called a mask because it can be used to identify the subnet to which an IP address belongs by performing a bitwise AND operation on the mask and the IP address.

In order for a message to reach a device of a correct IP address, each message is required to carry a subnet mask when travelling towards a common node.

Figures 4, 5, 5A:
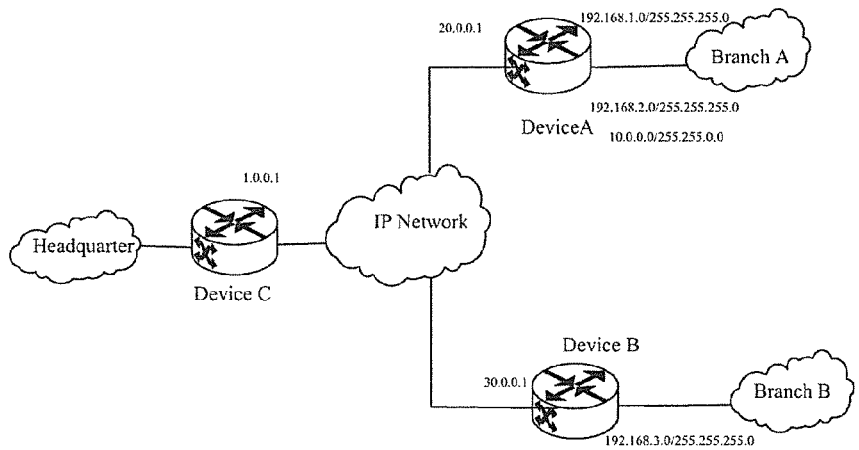
FIG. 4 is a GRE packet header according to an example of the present disclosure.
FIG. 5 is an example IP network utilising an example of the present disclosure.
FIG. 5A is an example tunnel table entry on the central node C containing the subnet mask information of the subnets of the example IP network of FIG. 5.

In the GRE header depicted in FIG. 4, the fields C, R, K, S, s, Recur, Flags, ver, protocol type, Check sum, Offset, Key, Sequence number, Routing and Payload have the usual meaning as defined in RFC 1701. One of the bits in the first row of the header is used as a network mask flag bit 'A' and the row 6 is a 'Network Mask' field. Meaning and application of the field bit 'A' and the 'network mask' will be described as follows.

In this example, a field bit 'A' of 0 means that the Network Mask field of the GRE header is empty while a field bit 'A' of 1 means that the Network Mask field contains a subnet mask. A node device upon receiving a packet containing a field bit 'A' of 1 in the GRE header will forward the packet according to the subnet information contained in the Network Mask field.

The significance of the value of the field bit 'A' is dependent on the direction of traffic flow and is as follows.

When data traffic flows from a branch node to a central node, a data packet carrying a header in which the field bit 'A' has a value of 1 signifies that the branch node is requesting the central node to associate the subnet from which the data comes with a corresponding tunnel. In such a case, the subnet mask is contained in the Network Mask field and the central node will establish a tunnel table according to the subnet mask contained in the Network Mask field.

When data traffic flows from the central node to a branch node, a field bit 'A' of the GRE header having a value of 1 together with a real, non-zero, subnet mask contained in the Network Mask field signifies the due establishment of a tunnel table. Therefore, this can be regarded as a message to notify that the tunnel table has been established.

On the other hand, when data traffic flows from the central node to a branch node with the GRE header having a field bit 'A' of value of 1 and the Network Mask field is all 0's, this means that the tunnel table needs refreshing. In other words, this can be regarded as a message for notification that tunnel refreshing is due. This message is also used to refresh the tunnel table timer or the reset the tunnel table.

Therefore, apart from being traffic flow direction dependent, the significance of the field bit 'A' of the GRE header is also dependent on the content of the value of the Network Mask field.

In the example of FIG. 4, the Network Mask field is an extension of a conventional GRE header. As an alternative example, the Routing (optional) field can be used to carry the Network Mask. This alternative Routing (optional) field is to be rendered obsolete in the latest RFC. Stated simple, the Network Mask field can be carried at any appropriate location of a GRE header provided that there is no adverse influence to interconnection.

The example IP network of FIG. 5 comprises a central node C which is connected to both a first branch node A and a second branch node B. The central node C is a common node connected to both branch nodes A and B, and each subnet comprises a plurality of data devices each having an individual or unique IP address.

In this example, the first subnet is connected to the first branch node A and possesses the following address spaces:
192.168.1.0/24
192.168.2.0/24
10.0.0.0/16

The second subnet is connected to the second branch node B and possesses the following address space:
192.168.3.0/24

When a message having a source address of 192.168.1.1 is sent to the central node via a branch node device A, the branch node device A will obtain the subnet mask of 255.255.255.0 of this subnet upon looking up the local routing table with reference to the source address. After the branch node device A has encapsulated a message originating from the source address 192.168.1.1, it will set the field bit 'A' to '1' and fill the Network Mask field with the subnet mask 255.255.255.0.

When the encapsulated message is received at the central node, the central node device will examine the value of the field bit 'A'. When the field bit is '1', the central node device will retrieve the information contained in the Network Mask field, establish a tunnel table entry and activate the tunnel table timer.

Subsequently when the central node C is to forward a message to a device in subnet A having a destination address 192.168.1.1, the central node C will set the value of the field bit 'A' to 1 and fill the Network Mask field with the subnet mask 255.255.255.0 to acknowledge establishment of a tunnel table. Since the message which is sent from the central node C to subnet A includes a GRE header having a field bit 'A' of 1 can be regarded as a message acknowledging or confirming the establishment of a tunnel table for that subnet, this message will be referred to as a 'tunnel establishment message' herein.

Because the subnet mask 255.255.255.0 is common and applicable to all devices of subnet A, all GRE encapsulated messages sent from the central node C to subnet A will carry the tunnel establishment message. For example, a message encapsulated in GRE and sent by the central node C to a device having an IP address 192.168.1.2 will carry the tunnel establishment message, even though the device having IP address 192.168.1.2 had not sent a message to the central node C to establish a tunnel table.

When a GRE encapsulated message sent from the central node C is received by the branch node device A, the processor of device A will read and retrieve the contents of the Network Mask field and establish a tunnel entry for the subnet 192.168.1.0/255.255.255.0. In this example, this tunnel is identified as tunnel 1 in the tunnel table of FIG. 6.

When a GRE encapsulated message having a source IP address 192.168.1.2 flows to the central node C, the branch node A processor will look up the local routing table and obtain the subnet mask 192.168.1.0/255.255.255.0 and note that the subnet 192.168.1.0/24 is identified as tunnel 1 on the tunnel table. This signifies or represents that a tunnel entry for this subnet has been established and further traffic of GRE encapsulated messages need not carry subnet mask information in the Network Mask field.

Where a device in subnet A has not received the tunnel establishment message, that device will continue sending the subnet mask information to the central node C until a tunnel establishment message sent by the central node C is received by subnet device.

The table of FIG. 5A is a tunnelling table entry stored in the central node of FIG. 5 and comprises the subnet information for all the 4 tunnels having the same tunnel destination address of 20.0.0.1.

To ensure that the tunnelling table entries are current, the central node will activate a timer when a tunnel entry is established and request a subnet device to refresh or update the tunnel table entry when a predetermined time has expired. The predetermined time can, for example, be half of the time set by the timer. For example, when the timer for the tunnel table entry for the device having IP address 192.168.1.0/24 indicates that half the time period set by the timer has expired, the central node C will generate a message having the field bit 'A' set to 1 and the subnet mask set to 0.0.0.0 for broadcasting to a subnet having a destination address 192.168.1.0/24 or any address under that subnet. This message will be referred to as a 'tunnel table update request', and will trigger a device of the 192.168.1.0/24 subnet to update the tunnel table entry.

When a device of the 192.168.1.0/24 subnet has received the tunnel table update request, the device will set the tunnel position mark of the subnet to 0 to signify that the GRE header does not carry a subnet mask and will trigger a fresh tunnel table establishing process. On the other hand, if no response is received by the central node from the subnet within a predetermined time, the tunnel table entry for this subnet will be removed.

To ensure safe receipt of the tunnel table update request by the subnet device, the central node can be set to send the 'tunnel table update request' three times. Of course, the number of repetition can be varied without loss of generality.

Whenever a new device is added or when there is a change in the address space of a subnet, the device of that subnet will look up the local routing table and trigger the tunnel table establishing process upon discovering that the tunnel position mark is 0.

Figures 6, 6A:
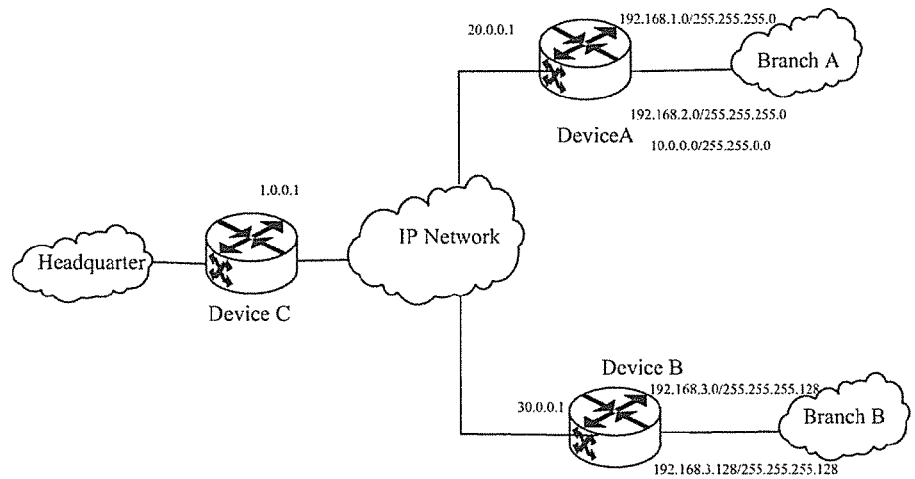
FIG. 6 depicts the example IP network of FIG. 5 with a subnet split into two subnets.
FIG. 6A is an example table entry corresponding to the updated IP network of FIG. 6.

For example, when the subnet having an address 192.168.3.0 and subnet mask of 255.255.255.0 is split into two subnets respectively having address 192.168.3.0 and subnet mask of 255.255.255.128, and address 192.168.3.128 and subnet mask of 255.255.255.128 as shown in FIG. 6, the tunnel establishing process will be activated when this subnet sends a GRE encapsulated message having the GRE header of FIG. 4 to the central node C for the first time. The central node C will establish an updated tunnel entry from the subnet address and subnet mask information and include the information at tunnel position mark 5 in the table entry a shown in FIG. 6A. After this has been done, the central node C will send tunnel establishment message to complete the tunnel establishing loop.

In another example as depicted in FIGS. 7 and 7A, the subnets having the address and subnet mask 192.168.1.0/255.255.255.0 and the address and subnet mask 192.168.2.0/255.255.255.0 are merged to form a new subnet having the following address and subnet mask:

192.168.1.0/255.255.255.0

As the two subnets were merged into a subnet, the central node will replace the two original tunnel table entries under tunnel numbers 1 and 2 with a new tunnel table entry for the merged subnet and renumber the tunnel numbers consequentially. The replacement will occur when a device of the merged subnet connected to the branch device B sends a GRE encapsulated message to the central node C for the first time or when a device connected to the merged subnet sends a message to the central node in response to the tunnel table update request.

In another example as depicted in FIGS. 8 and 8A, the subnet having the address and subnet mask 10.0.0.0/255.255.0.0 is replaced by another subnet having subnet address and subnet mask 172.0.0.0/255.255.0.0. The central node will replace the original tunnel table entry under tunnel number 2 for the subnet 10.0.0.0/255.255.0.0 with a new tunnel table entry for the replacement subnet having the address and subnet mask 172.0.0.0/255.255.0. In other words, the tunnel table entry for tunnel table entry number 2 will be updated. The update will occur when a device of the replacement subnet connected to the branch device B sends a GRE encapsulated message to the central node C for the first time or when a device connected to the replacement subnet sends a message to the central node in response to the tunnel table update request.

In general, when a device of a subnet sends a GRE encapsulated message to the central node for the first time, the branch device will send a message to the central node containing the subnet mask information of that subnet. Upon receipt of the subnet mask information, the central node will send a tunnel establishment message to the subnet to confirm successful establishment of the tunnel table entry for that subnet. To ensure that the tunnel table entries are current, the central node will request a branch device of a subnet to re-establish the table entry after expiry of a predetermined period.

The central node and branch devices described herein are both network devices. In the context of this disclosure a 'network device' is a device for forwarding GRE packets in a network, e.g. a switch or router etc. The methods described in this disclosure may be implemented by software (e.g. machine readable instructions executed by a processor) or hardware (e.g. an ASIC which is itself a form of processor) or a combination of hardware and software.

While the disclosure has been described with reference to the example networks above, it should be appreciated that disclosure herein can be applied to other network configuration without loss of generality. For example, more than two branch node devices can be connected to the central device and the number of subnets connected to each branch node device can be variable.

Furthermore, while the field bit 'A' herein is set to example values to signify different status, it will be appreciated that different values can be used to signify different status without loss of generality. A node device or a forwarding device herein can be a router, a network switch, a network server or other data forwarding devices without loss of generality.

The invention claimed is:

1. A method of forwarding generic routing encapsulation (GRE) encapsulated messages by a forwarding device, the method comprising:
   receiving, by the forwarding device, a GRE encapsulated message from a subnet, wherein the GRE encapsulated message includes a network mask status flag and a network mask field in a GRE header, and wherein the network mask status flag is set to a first value to indicate that the network mask field contains subnet mask information of the subnet;
   setting up, by the forwarding device, a tunnel table entry for the subnet based on the subnet mask information in the network mask field of the received GRE encapsulated message; and
   sending, by the forwarding device, a response message to the subnet after setting up the tunnel table entry, the response message comprising information informing the subnet of the setting up of said tunnel table entry.

2. The method according to claim 1, wherein the method comprises setting a status flag in a GRE header of the response message to indicate a presence of the subnet mask information in the GRE header before the response message is sent from the forwarding device to the subnet.

3. The method according to claim 2, wherein the method comprises including the subnet mask information in the response message to inform the subnet of the setting up of the tunnel table entry.

4. The method according to claim 1, wherein the method comprises setting a status flag in a GRE header of the response message to indicate the setting up of the tunnel table entry before the response message is sent from the forwarding device to the subnet.

5. The method according to claim 1, wherein the method comprises the forwarding device updating the tunnel table entry at an expiration of a predetermined time period.

6. The method according to claim 5, wherein the updating of the tunnel table entry is activated by a timer.

7. The method according to claim 1, wherein the method comprises associating a tunnel destination address and the subnet mask information of the subnet in the tunnel table entry.

8. A network device for forwarding generic routing encapsulation (GRE) encapsulated packets, the network device comprising:

a processor; and a memory storing executable instructions to cause the processor to:

receive a GRE encapsulated message from a subnet, wherein the GRE encapsulated message includes a network mask status flag and a network mask field in a GRE header, and wherein the network mask status flag is set to a first value to indicate that the network mask field contains subnet mask information of the subnet;

set up a tunnel table entry for the subnet based on the subnet mask information in the network mask field of the received GRE encapsulated message; and send a response message to the subnet after setting up the tunnel table entry, the response message comprising information informing the subnet of the setting up of said tunnel table entry.

9. The network device according to claim 8, wherein the processor is to set up a status flag in a GRE header of the response message to indicate a presence of the subnet mask information in the GRE header before the response message is sent to the subnet.

10. The network device according to claim 9, wherein the processor is to include the subnet mask information in the response message to inform the subnet of the setting up of the tunnel table entry.

11. A non-transitory computer readable medium on which is stored executable instructions, which when executed by a processor, cause the processor to:

receive a GRE encapsulated message from a subnet, wherein the GRE encapsulated message includes a network mask status flag and a network mask field in a GRE header, and wherein the network mask status flag is set to a first value to indicate that the network mask field contains subnet mask information of the subnet;

set up a tunnel table entry for the subnet based on the subnet mask information in the network mask field of the received GRE encapsulated message; and send a response message to the subnet after setting up the tunnel table entry, the response message comprising information informing the subnet of the setting up of said tunnel table entry.

12. The non-transitory computer readable medium according to claim 11, wherein the executable instructions further cause the processor to set up a status flag in a GRE header of the response message to indicate a presence of the subnet mask information in the GRE header before the response message is sent to the subnet.

* * * * *

UNITED STATES PATENT AND TRADEMARK OFFICE
CERTIFICATE OF CORRECTION

PATENT NO. : 8,767,712 B2  Page 1 of 1
APPLICATION NO. : 13/470020
DATED : July 1, 2014
INVENTOR(S) : Jie Li et al.

It is certified that error appears in the above-identified patent and that said Letters Patent is hereby corrected as shown below:

In the Specification

Column 1, line 4, delete "35 U.S." and insert -- 35 U.S.C --, therefor.

Signed and Sealed this
Seventh Day of October, 2014

Michelle K. Lee
*Deputy Director of the United States Patent and Trademark Office*